Patented Feb. 14, 1928.

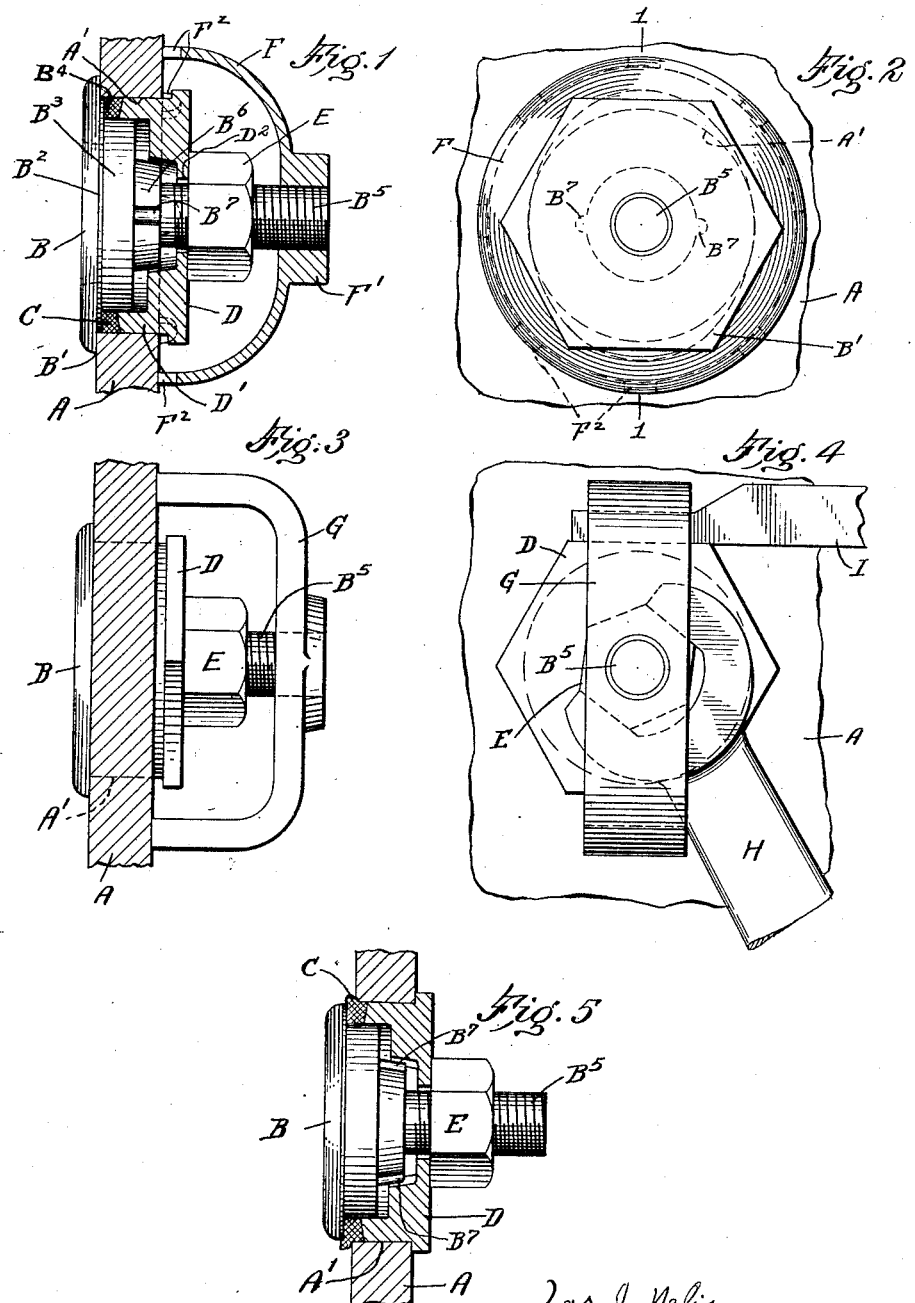

1,659,301

UNITED STATES PATENT OFFICE.

JOSEPH J. NELIS, OF BROOKLYN, NEW YORK, AND STANFIELD N. ARNOLD, OF PLAINFIELD, NEW JERSEY, ASSIGNORS TO FOSTER WHEELER CORPORATION, OF NEW YORK, N. Y., A CORPORATION OF NEW YORK.

HANDHOLE CLOSURE.

Application filed December 11, 1925. Serial No. 74,665.

The general object of the present invention is to provide an improved closure for hand hole openings in boiler walls, superheater and economizer headers, and generally where hand hole closures are subjected to relatively high pressures and temperatures. More specifically, the object of the invention is to provide an improved hand hole closure of the type in which a gasket is compressed between the peripheral wall of the hand hole and an incompressible portion of the hand hole closure located within said opening.

In a hand hole closure of the type just described, the joint is sealed without necessarily anchoring the closure against axial movement in said hole, and in consequence force, accidentally applied to the external portion of the closure, may displace the latter and thereby destroy or injure the gasket and cause leakage, and the present invention is characterized by the provisions made for anchoring a closure of the above mentioned type to the wall in which the closure is mounted.

The various features of novelty which characterize our invention are pointed out with particularity in the claims annexed to and forming a part of this specification. For a better understanding of the invention, however, its advantages and specific objects attained with its use, reference should be had to the accompanying drawings and descriptive matter in which we have illustrated and described preferred embodiments of our invention.

Of the drawings:

Fig. 1 is a section on the line 1—1 of Fig. 2;

Fig. 2 is a front elevation of a portion of a wall provided with the improved hand hole closure;

Fig. 3 is an elevation partly in section illustrating a modified closure;

Fig. 4 is a front elevation of the construction shown in Fig. 3; and

Fig. 5 is a section taken similarly to Fig. 1 illustrating a manner in which the closure can fail when the guard member is omitted.

In the form of hand hole closure illustrated in the drawings, B represents the body or plug member of the hand hole closure for the opening A′ in a header wall A, or the like. As shown, the member B comprises an enlarged head portion which bears against the inner side of the wall A at the margin of the opening A′. As shown in Fig. 2, the outline B′ of the enlarged head is oval to permit of the insertion and removal of the head through the opening A′ which ordinarily is cylindrical and of a diameter less than the maximum diameter of the head outline B′. Immediately adjacent the enlarged head and at the outer side of the latter is a short cylindrical portion $B^2$ forming a centering portion but little smaller in diameter than the hole A′ and surrounded by a compressible gasket C. The inner end of the latter bears against the surface $B^4$ extending from the base of the portion $B^3$ to the peripheral edge of the portion $B^2$. The gasket is clamped between the surface $B^4$ and the end surface of the tubular portion D′ of a gland member D which is inserted in the outer end of the hole A′ and surrounds and telescopes with the portion $B^3$ of the member B. In the preferred construction illustrated, the surface $B^4$ is a plane surface and the gasket engaging end surface portion is tapered so that the portion of the gasket engaging the wall of the hole A′ is thicker than the portion engaging the periphery of the part $B^3$. Preferably the portion $B^3$ of the plug member B should be cylindrical as shown.

The member D, which may be described as cup-shaped, is formed with a passage $D^2$ in its end wall through which the threaded stem portion $B^5$ of the member B extends. Advantageously, as shown, the end wall of the member D is internally recessed to receive a portion $B^6$ of the member B which is larger in diameter than the stem portion $B^5$ and appreciably smaller in diameter than the gland surrounded portion $B^3$. The members B and D should be keyed together to prevent their relative rotation, and as shown, this key action is secured by means of ribs $B^7$ at the periphery of the portion $B^6$ which enter longitudinally extending grooves formed in the adjacent portion of the member D. The members B and D are drawn together by a nut E screwed on the threaded stem $B^5$. A cup-shaped guard member F bears at its rim against the outer surface of the wall A at some distance from the margin of the opening A'. As shown, the member F is formed with a hub portion F' threaded to receive the stem B⁵, and advantageously, as shown, the member F is formed with notches F² at its rim which serve as drain holes for any fluid working through the hand hole. For use with boiler and like pressure temperature conditions, the plug member B and gland member D are advantageously steel forging parts. The guard member F may also be a steel forging or may be made of other metal.

It will be observed that while the head portion B' of the member B is normally held against the inner face of the wall A by the internal fluid pressure, the hole A' is actually sealed, and leakage through the joints of the closure is prevented by the gasket C. The latter may be made of soft metal, impregnated fabric or other compressible gasket material suitable for use under the temperature, pressure and other adverse conditions of use. Normally, as shown in Fig. 1, the enlarged head portion of the member D does not engage the outer surface of the wall A, but is spaced away from the latter to insure uniform pressure on the gasket and to permit the possibility of further gasket compression when such compression becomes necessary to avoid leakage. With the enlarged head of the member D thus spaced away from the wall A, there is nothing in the closure proper to prevent inward movement of the closure for a distance sufficient to destroy the joint sealing effectiveness of the gasket.

The manner in which the effectiveness of the closure may be impaired by inward movement as the result, for example, of an accidental blow against the external portion of the closure, is illustrated in Fig. 5. When the closure is forced inward as shown in Fig. 5, the gasket extrudes between the inner margin of the opening A' and the enlarged head of the plug member B, thus reducing the pressure of the gasket material against the peripheral wall of the hole A' and the outer surface of the portion B³ which normally prevents leakage. The extrusion of the gasket material, as shown in Fig. 5, not only gives rise to leakage, but ordinarily requires the extruded and distorted gasket to be replaced by a new gasket before the hand hole opening can be properly resealed. Furthermore, when the gasket is distorted as shown in Fig. 5, it is apt to be blown entirely out of place by the pressure, thus giving rise to serious leakage. The guard member F applied as shown in Figs. 1 and 2, obviously prevents any accidental displacement of the closure and the ill consequences of such displacement illustrated in Fig. 5. While in a general way the utility of the closure does not depend on the form of the gasket engaging surfaces of the members B and D, we believe the best results are obtainable when the surface B⁴ at the bottom or inner side of the gasket is a plane surface, as shown.

In lieu of the cup-shaped guard member F shown in Figs. 1 and 2, guard members of other form may be employed. For example, I may employ a guard member in the form of the simple yoke or U-shaped member G, shown in Figs. 3 and 4. The member G is formed with a threaded opening to receive the end of the stem B⁵, and has bent end portions which engage the outer surface of the wall A at opposite sides of the opening A'. While the member G does not as effectually enclose and shield the outer portion of the hand hole closure proper against all sorts of injuries as does the cup-shaped member F, the member G is obviously effective to prevent displacement of the closure, and in large part protects the external end of the closure against injury by accidental contact with external objects. The yoke member G, which may well be a steel forging, possesses the special advantage that it facilitates the operation of holding the closure parts against rotation when the nut E is being tightened up, or is being loosened preparatory to the removal of the closure. For thus holding the closure against rotation, I preferably employ a bar-like implement I, which may be inserted between one leg of the yoke and the extending side of the head portion of the gland member D, which, as shown, is of polygonal form, and as previously described, is held against rotation relative to the plug member B by the key ribs B⁷. The bar I inserted as shown in Fig. 4, prevents rotation of the gland without interfering with the engagement of the nut E by a wrench H employed to rotate the nut. By preventing the gland D from rotating when the nut E is being tightened or loosened, I avoid the cutting or wearing away of the gasket C or other parts of the closure which is apt to occur if and when the parts are permitted to rotate in assembling or disassembling the closure.

It will be apparent, of course, that rotation of the gland D while the nut E is being tightened or loosened, may be prevented by the application of a wrench directly to the polygonal head of the member D, but the yoke G and implement I form such convenient and effective means for the purpose, that in practice I prefer to provide an element like the yoke member G and a tool like the bar I, for temporarily holding the gland D against rotation in tightening and loosening the nut E even though the closure is normally protected by a guard member F of the construction shown in Figs. 1 and 2.

The closure construction proper illustrated herein, is desirably simple and effective as well as relatively inexpensive and durable. The gasket C may be readily and inexpensively renewed when such renewal becomes necessary, and the hand hole may be opened and reclosed with comparative ease whenever necessary. In case of gasket failure in use, the attendants and by-standers are thoroughly protected by the guard F and are protected to a substantial degree by the guard G against the risk of being struck and injured by heavy portions of the gasket or other closure parts blown out of the hand hole opening when the gasket fails.

While in accordance with the provisions of the statutes, we have illustrated and described the best forms of embodiment of our invention now known to us, it will be apparent to those skilled in the art that changes may be made in the form of the apparatus disclosed without departing from the spirit of our invention as set forth in the appended claims and that in some cases certain features of our invention may be used to advantage without a corresponding use of other features.

Having now described our invention, what we claim as new and desire to secure by Letters Patent is:

1. In a hand hole closure, the combination of a plug member comprising an enlarged head, a threaded stem, and an intermediate portion, said head being adapted to engage the inner surface of a wall having a hand hole opening at the margin of said opening, with said intermediate portion located in said opening and separated from the peripheral wall thereof by a gasket receiving space and with said stem projecting from the outer side of said wall, a gland provided with an aperture to receive said stem and comprising a gasket compressing portion adapted to enter said space, a nut threaded on said stem for moving said gland toward said head, and a guard member threaded on said stem on the outer side of said nut and shaped to extend about said nut and gland into engagement with the outer side of said wall at the margin of said opening, the outer face of said member and the end of said stem being in substantially the same plane.

2. In a hand hole closure, the combination of a plug member comprising an enlarged head, a threaded stem, and an intermediate portion, said head being adapted to engage the inner surface of a wall having a hand hole opening at the margin of said opening, with said intermediate portion located in said opening and separated from the peripheral wall thereof by a gasket receiving space and with said stem projecting from the outer side of said wall, a gland provided with an aperture to receive said stem and comprising a gasket compressing portion adapted to enter said space, and a nut threaded on said stem for moving said gland toward said head, said gland and plug member having co-operating surfaces permitting axial, but preventing angular relative adjustments of said member and gland, and said gland having a portion adapted to be engaged by means preventing rotation of the gland when said nut is being tightened and loosened.

3. In a hand hole closure, the combination of a plug member comprising an enlarged head, a threaded stem, and an intermediate portion, said head being adapted to engage the inner surface of a wall having a hand hole opening at the margin of said opening, with said intermediate portion located in said opening and separated from the peripheral wall thereof by a gasket receiving space and with said stem projecting from the outer side of said wall, a gland provided with an aperture to receive said stem and comprising a gasket compressing portion adapted to enter said space, a nut threaded on said stem for moving said gland toward said head, and a guard member threaded on said stem on the outer side of said nut and shaped to extend about said nut and gland into engagement with the outer side of said wall at the margin of said opening, said gland and plug member having co-operative surfaces permitting axial, but preventing angular relative adjustments of said member and gland, and said gland having a portion adapted to be engaged by means preventing rotation of the gland when said nut is being tightened and loosened.

4. In a hand hole closure, the combination of a plug member comprising an enlarged head, a threaded stem, and an intermediate portion, said head being adapted to engage the inner surface of a wall having a hand hole opening at the margin of said opening, with said intermediate portion located in said opening and separated from the peripheral wall thereof by a gasket receiving space and with said stem projecting from the outer side of said wall, a gland provided with an aperture to receive said stem and comprising a portion adapted to enter said space, a nut threaded on said stem for moving said gland toward said head, and a yoke shaped member threaded on said stem on the outer side of said nut with its legs extending about said nut and gland into engagement with the outer surface of said wall, the outer face of said member and the end of said stem being in substantially the same plane.

5. In a hand hole closure, the combination of a plug member comprising an enlarged head, a threaded stem, and an intermediate portion, said head being adapted to engage the inner surface of a wall having a hand hole opening at the margin of said opening, with said intermediate portion located in said opening and separated from the peripheral wall thereof by a gasket receiving space and with said stem projecting from the outer side of said wall, a gland provided with an aperture to receive said stem and comprising a portion adapted to enter said space, a nut threaded on said stem for moving said gland toward said head, and a yoke shaped member threaded on said stem on the outer side of said nut with its legs extending about said nut and gland into engagement with the outer surface of said wall, said gland having a flattened portion between which and an adjacent leg of the last mentioned member an implement may be inserted to prevent rotation of the gland when said nut is being tightened and loosened.

6. In a hand hole closure, the combination of a plug member comprising an enlarged head, a plug centering portion adjacent said head, a threaded stem, and an intermediate portion between the stem and centering portion and of smaller diameter than said centering portion, said head being adapted to engage the inner surface of a wall having a hand hole opening at the margin of said opening, with said centering and intermediate portions located in said opening and forming the inner end and internal walls of an annular gasket receiving space within said opening, and with said stem projecting from the outer side of said wall, the end surface of said centering portion forming the inner end of said gasket receiving space being a plane surface, a gland provided with a recess and an aperture to receive said intermediate portion and stem respectively and comprising a gasket compressing portion adapted to enter said space, said gland and intermediate portion being provided with cooperating surfaces preventing the relative rotation of said parts, and a nut threaded on said stem for moving said gland toward said head.

Signed at New York city, in the county of New York, and State of New York, this 9th day of December, A. D. 1925.

JOSEPH J. NELIS.
STANFIELD N. ARNOLD.